United States Patent
Boehl et al.

(10) Patent No.: US 9,509,497 B2
(45) Date of Patent: *Nov. 29, 2016

(54) METHOD FOR GENERATING A RANDOM OUTPUT BIT SEQUENCE

(75) Inventors: Eberhard Boehl, Reutlingen (DE); Paulius Duplys, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 398 days.

This patent is subject to a terminal disclaimer.

(21) Appl. No.: 14/131,134

(22) PCT Filed: Jun. 19, 2012

(86) PCT No.: PCT/EP2012/061708
§ 371 (c)(1),
(2), (4) Date: Apr. 15, 2014

(87) PCT Pub. No.: WO2013/004490
PCT Pub. Date: Jan. 10, 2013

(65) Prior Publication Data
US 2014/0219444 A1    Aug. 7, 2014

(30) Foreign Application Priority Data

Jul. 5, 2011    (DE) .................. 10 2011 078 643

(51) Int. Cl.
*H04L 9/08* (2006.01)
*H04L 9/00* (2006.01)
*G06F 7/58* (2006.01)

(52) U.S. Cl.
CPC ............. *H04L 9/0816* (2013.01); *G06F 7/582* (2013.01); *H04L 9/003* (2013.01); *H04L 9/004* (2013.01); *H04L 2209/24* (2013.01)

(58) Field of Classification Search
CPC ....... H04L 9/3247; H04L 9/003; H04L 9/32; H04L 9/0816; H04L 9/004; G06F 7/582; G06F 7/584; G09C 1/00

USPC ........................................................... 380/46
See application file for complete search history.

(56) References Cited

U.S. PATENT DOCUMENTS

| | | | | |
|---|---|---|---|---|
| 4,780,814 A | * | 10/1988 | Hayek .................. | G06F 13/385 710/105 |
| 2002/0009165 A1 | * | 1/2002 | Friedman .............. | H04J 3/0608 375/340 |
| 2002/0051537 A1 | | 5/2002 | Rogaway | |

FOREIGN PATENT DOCUMENTS

| | | |
|---|---|---|
| CN | 1858722 A | 11/2006 |
| WO | 2010/149491 | 12/2010 |

OTHER PUBLICATIONS

Menezes A. J. et al., "Handbook of Applied Cryptopgraphy", Chapter 6: Stream Ciphers, CRC Press, Boca Raton, FL. US, Oct. 1, 1996, XP001525006, pp. 191-222.

(Continued)

*Primary Examiner* — Tu Nguyen
(74) *Attorney, Agent, or Firm* — Norton Rose Fulbright US LLP; Gerard Messina

(57) ABSTRACT

A method and a random bit generator for generating a random output bit sequence. In this method, a configuration of $2^n$ state machines is used, the state machines each including n state bits, each state machine always assuming a different state than the other state machines of the configuration, an input signal being supplied to the input end of the state machines, and these each generating n signature bits, which together form a signature bit sequence, as a function of their state, the random output bit sequence being generated by selection of individual bits from the signature bit sequences of all state machines of the configuration.

15 Claims, 7 Drawing Sheets

(56) References Cited

OTHER PUBLICATIONS

Tarnick S, "Design of Embedded Constant Weight Code Checkers Based on Averaging Operations", IEEE 16th International On-Line Testing Symposium (IOLTS), Piscataway, NJ, USA, Jul. 5, 2010, XP031744463, pp. 255-260.

Menezes A. J. et al., " Handbook of Applied Cryptopgraphy", Chapter 7: Block Ciphers, CRC Press, Boca Raton, FL. US, Oct. 1, 1996, XP001525007, pp. 223-282.

Stroele A. P. et al., "Programmable Embedded Self-Testing Checkers for All Unidirectional Error-Detecting Codes", VLSI Test Symposium 1999, 17th IEEE Dana Point, Los Alamitos, CA, USA, Apr. 25, 1999, XP010334883, pp. 361-369.

Duplys P. et al., "Key Randomization Using a Power Analysis Resistant Deterministic Random Bit Generator", IEEE 16th International On-Line Testing Symposium (IOLTS), Piscataway, NJ, USA, Jul. 5, 2010, XP031744467, pp. 229-234.

"Chapter 6 : Stream Ciphers ED—Menezes A.J. ; Van Oorschot P C ; Vanstone S A", Handbook of Applied Cryptography; [CRC Press Series on Discrete Mathematices and Its Applications], CRC Press, Boca Raton, FL, US, pp. 191-222, Oct. 1, 1996, XP001525006, ISBN : 978-9-8493-8523-0, Retrieved from the Internet : URL :http://www.cacr.math.uwaterloo.ca/hac/pp. 211-212.

Tarnick S: "Design of embedded constant weight code checkers based on averaging operations", On-Line Testing Symposium (IOLTS), 2010 IEEE 16$^{th}$ International, IEEE, Piscataway, NJ, USA. Jul. 5, 2010, pp. 255-260, XP031744463, ISBN: 978-1-4244-7724-1.

"Chapter 7: Block Ciphers ED—Menezes A J; Van Oorschot P C; Vanstone S A" Oct. 1, 1996, Handbook of Applied Cryptography; [CRC Press Series on Discrete Mathematices and Its Applications], CRC Press, Boca Raton,FL, US, pp. 223-282, XP001525007, ISBN: 978-9-8493-8523-0, pp. 253, 250.

Stroele A P et al : "Programmable embedded self-testing checkers for all-unidirectional error-detecting codes", VLSI Test Symposium, 1999, Proceedings. 17th IEEE Dana Point, CA, USA Apr. 25-29, 1999, Los Alamitos, CA, USA, IEEE Comput. Soc., US, Apr. 25, 1999, pp. 361-369, XP010334883, DOI: 10.1109/VTEST.1999.766690, ISBN: 978-9-7695-0146-8, table 3.

Duplys P et al : "Key randomization using a power analysis resistant deterministic random bit generator", On-Line Testing Symposium (IOLTS), 2010 IEEE 16$^{th}$ International, IEEE, Piscataway, NJ, USA. Jul. 5, 2010, pp. 229-234, XP031744467, ISBN: 978-1-4244-7724-1.

Mangard, Oswald and Popp, "Power Analysis Attacks", Spring 2007.

\* cited by examiner

METHOD FOR GENERATING A RANDOM OUTPUT BIT SEQUENCE

FIELD OF THE INVENTION

The present invention relates to a method for generating a random output bit sequence and a random bit generator for carrying out the method.

BACKGROUND INFORMATION

For generating random bit sequences, random bit generators are used which generate a random output bit sequence upon input of an input bit sequence.

When used for cryptographic devices and cryptologic algorithms, random bit generators are exposed to attacks in which protected data are to be manipulated or read out. With the customary encryption methods today, e.g., the Advanced Encryption Standard (AES), keys are used which, due to the key length of 128 bits or more, cannot be ascertained by "trial and error" (so-called brute force attacks) even when high-speed computer techniques are used. An attacker will therefore also investigate secondary effects of an implementation such as the chronological course of the electric power consumption, the chronological duration or the electromagnetic emission of a circuit during the encryption operation. These attacks are referred to as side channel attacks since they are not aimed directly at the function.

These side channel attacks (SCAs) utilize the physical implementation of a cryptographic system in a device. The control unit having cryptographic functions is observed during the execution of the cryptologic algorithms to find correlations between the observed data and the hypotheses for the secret key.

There are numerous side channel attacks such as those in the publication by Mangard, Oswald and Popp in "Power Analysis Attacks," Springer 2007, for example. A successful attack on the secret key of the AES is practically feasible, in particular with the aid of differential power analysis (DPA).

In a DPA, the electric power consumption of a microprocessor is recorded during cryptographic calculations, and traces of the power consumption are compared with hypotheses by using statistical methods.

In such methods, which make a DPA difficult, there is intervention into the algorithm itself. The operations are then carried out using randomly varied operands during masking, and as a result, the random value is then subtracted out again, which means that the random event has no effect on the result. Another possibility is the so-called hiding, in which an attempt is made to compensate for high-low transitions through corresponding low-high transitions.

Random bit generators are required for various security-critical applications. Random values may be used in particular to shuffle the operations during encryption with the aid of the AES algorithm or also to additionally insert so-called dummy operations. This makes side channel attacks such as a DPA difficult because the operation to be attacked is being carried out randomly at different points in time. A plurality of measurements is then needed for a DPA, to be able to ascertain the secret key, which makes the attack difficult.

However, previous random bit generators are not themselves protected against a DPA. If an attacker initially ascertains the secret random numbers through a DPA attack, he is then able to attack the encryption algorithm itself by knowing these random numbers. Knowing the random numbers during shuffling and dummy operations makes it possible to determine the points in time relevant for a DPA attack.

SUMMARY OF THE INVENTION

Against this background, a method for generating a random output bit sequence according to the present invention and a random bit generator according to the present are presented. Embodiments are derived from the description below.

Other random bit generators, which are also more or less immune to side channel attacks and to a DPA in particular, require extremely complex circuitry. The reason for this is that these generators always require dedicated countermeasures to be resistant to DPA attacks. In contrast with that, the approach presented here is inherently immune to DPA attacks and offers a deterministic random bit generator (DREG), which has a very low circuit complexity and is robust to DPA attacks in comparison with the related art.

In addition, the method presented here has the advantage that all selected bits select a zero or a one with a probability of 50%.

Additional advantages and embodiments of the present invention are derived from the description and the accompanying drawings.

It is self-evident that the features described above and those to be explained below may be used not only in the particular combination given but also in other combinations or alone without departing from the scope of the present invention.

DETAILED DESCRIPTION

Figure 1:
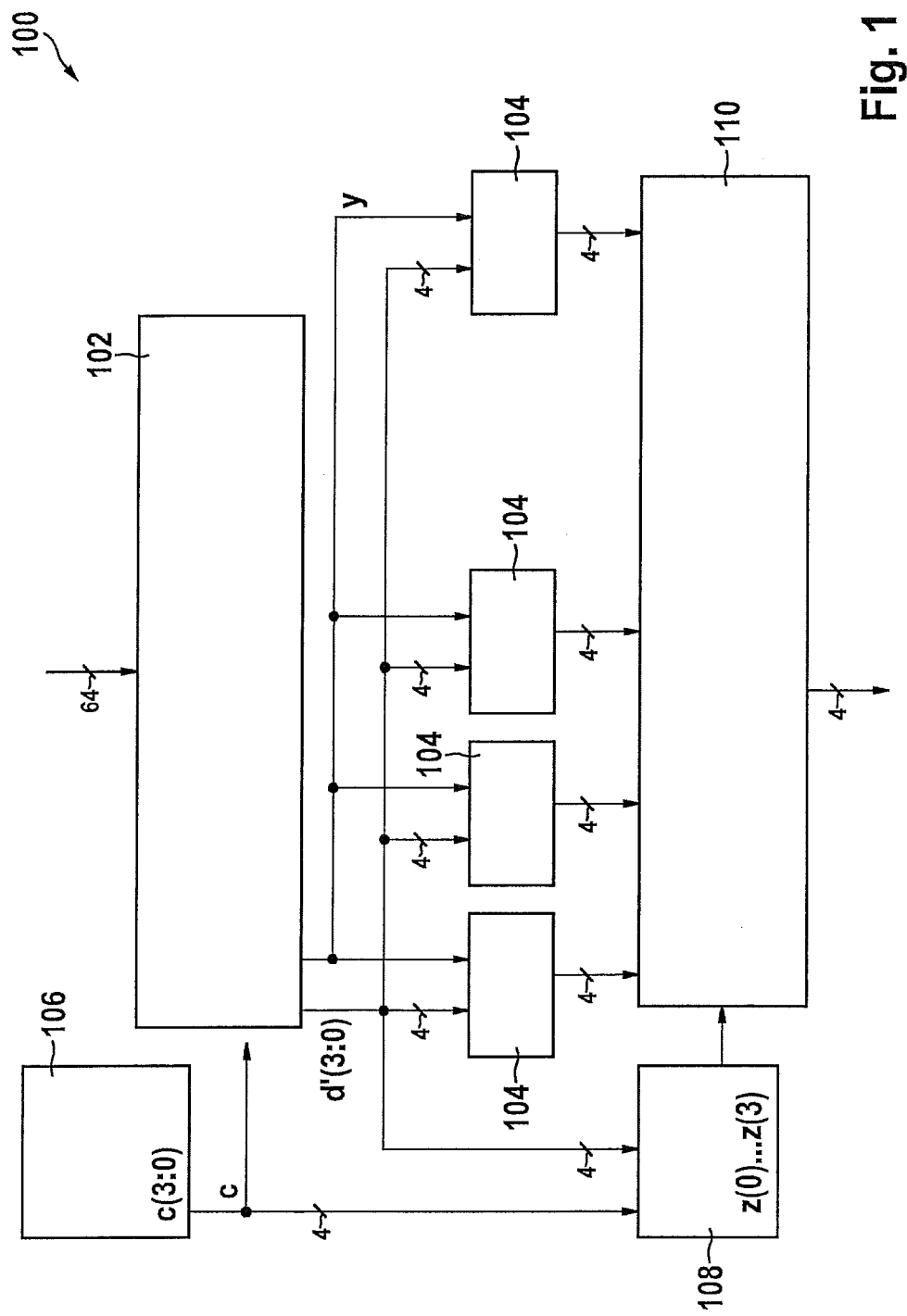
FIG. 1 shows one specific embodiment of the random bit generator presented here.

The present invention is represented schematically in the drawings on the basis of specific embodiments and is described in greater detail below with reference to the drawings.

FIG. 1 shows one specific embodiment of the random bit generator, which is labeled with reference numeral 100 on the whole. This includes an input stage 102, into which up to 64 input bits may be entered as the input signal. These input bits are formed in portions of up to four bits to yield modified input bits d'(3) . . . d'(0), with the insertion of parity bits, if necessary, and then after being generated, these modified input bits are forwarded by a switch bit y.

The next stage is 16 similarly configured state machines 104, only four of which are shown in this diagram for the sake of clarity. Each of these state machines 104 has four state bits, each state machine 104 assuming a different state, which is defined by the state bits at each point in time. In the case of four state bits, this yields $2^4=16$ possible states for each state machine, i.e., all possible states are assumed by these 16 state machines 104. Since each state machine always assumes a different state, the number of possibilities is a permutation of 16, which may be calculated by 16!=16*15*14* . . . 2*1.

In addition, a clock counter 106 c(3:0), which increments its value by one with each clock, is provided. Counter bits z(0) . . . z(3) are generated from these counter values together with the modified input bits and used to select the random bits in multiplexers 102.

State machines 104 each generate deterministically four signature bits as a signature bit sequence. This signature bit sequence depends on the prevailing initial state of state machine 104 as well as on the signals from input stage 102. State machines 104 are configured in such a way that they assume an unambiguous subsequent state in a predefined input signal sequence (from 102) and each state also has an unambiguous predecessor state. Therefore, since all signals from input stage 102 are similarly connected to all state machines 104, it is ensured that all state machines 104 will assume a different state at each point in time.

The signature bits of all state machines 104 form the so-called signature, which is entered into an output stage 110. A selection of four bits of the 4*16=64 state bits of the signature will then be made in this output stage 110 with counter values of unit 108. These four bits form a deterministic output bit sequence when all initial states and input bits as well as the configuration of the parity bits and of switch bits y in input stage 102 are known. However, if the sequence of the initial states of state machines 104 is not known, the output bit sequence is also unknown. The output bit sequence therefore appears to be random.

In the implementation depicted in FIG. 1, it is thus proposed that a signature be formed from multiple identically configured and identically triggered state machines 104, which are implemented as NLMISRs (nonlinear multiple input shift registers), for example, which are operated in parallel and have different initial states. To impede DPA attacks, all state machines 104 should switch at the same time and should have different initial states.

Although it is known that multiple structures are used, as shown in FIG. 1, whose output bits or signature bits are linked together linearly to form a random value, in such a way that the state bits of different state machines are used for each input bit, the individual signatures being mixed there by rotation, a different approach is pursued here.

This method fundamentally includes three method steps in this embodiment:
1. Forming the signature from a sequence of input signals by initializing the state machines with different initial states (secret initial state).
2. Selecting only a few bits from the signature as random bits (which may be four).
3. Making the selection of the bits dependent on the input signals.

Figure 2:
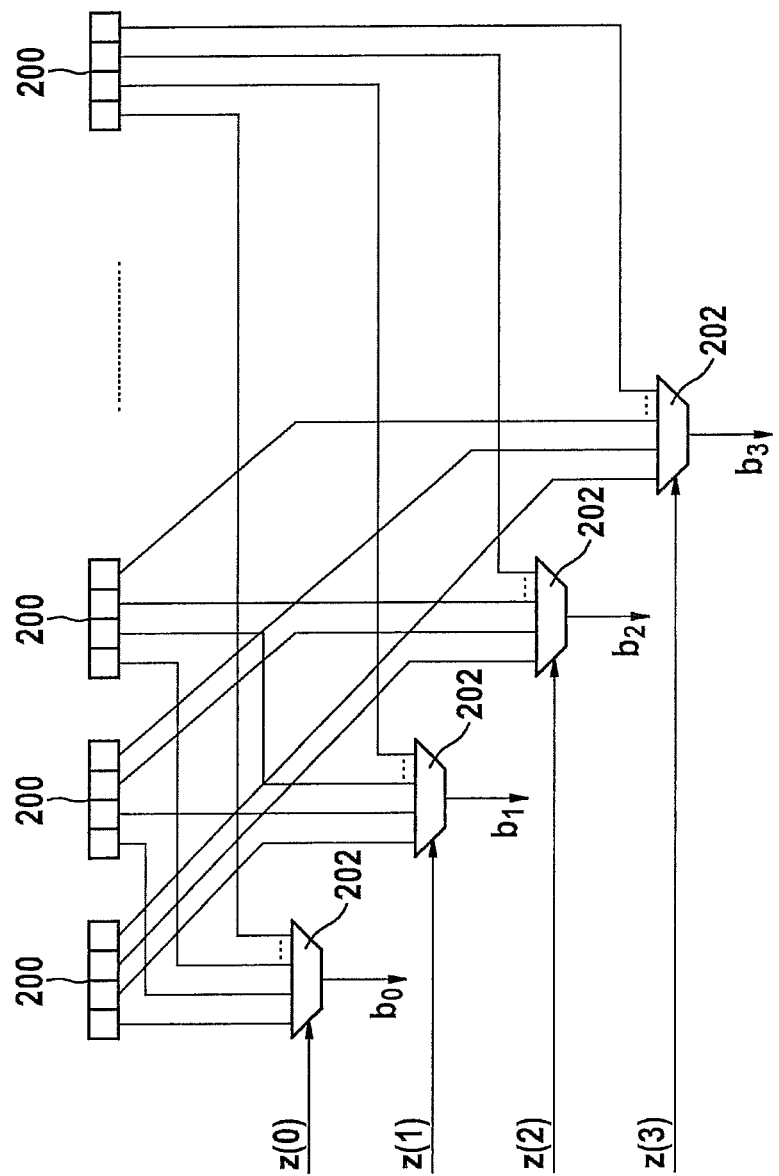
FIG. 2 shows the selection of-four-bits from 16 state machines.

FIG. 2 shows the selection of four bits from 16 state machines, for example, from state machines 104 shown in FIG. 1. This selection is typically made in output stage 110 (FIG. 1).

This diagram shows 16 signature bit sequences 200, which together form the signature. Signature bit sequence 200 of each state machine includes four bits. The four bits of the random output bit sequence are selected using counter values z(0) . . . z(3) and four multiplexers 202 (in the selected configuration, these are 1-out-of-16 multiplexers). In this case, the MSB (most significant bit) of the output bit sequence is selected from the MSBs of 16 signature bit sequences 200, the next significant bit is selected from the next significant bits of 16 signature bit sequences 200, etc.

The linear linkage of the signature bits mentioned above as being known has the goal of reducing the dependence of the individual bits in the signatures on one another. However, the same effect may be achieved if not all bits of the signature are used. If the MSB of one of the 16 state machines is selected as the result MSB (NLMISR, see below), the second bit is also selected from the 16 state machines (NLMISR), etc., down to the LSB, which is also selected from the LSBs of all 16 state machines (NLMISR), then one has a total of four bits in a structure of 16 NLMISR, these four bits assuming values of zero and one completely independently of one another, as shown in FIG. 2. Since each bit is always selected from eight ones and eight zeros, each bit has a 50% probability of a one and the same for a zero.

This equal probability is ensured by the fact that all state machines assume a different state at each point in time, and with 16 state machines, a one occurs as the MSB exactly eight times in these 16 possible states and a zero occurs as the MSB eight times. The same distribution holds for all other bit positions of the state machines.

To generate a plurality of these bits, four bits are generated several times in succession using different input signals, or four bits are taken from the signature at different points in time. The number of input bits is increased here accordingly, if necessary.

The bits may be selected by multiplexers 202. A rotation may be dispensed with in this case, although lengthening of the input phase with several input bits in succession results in a lengthening of the input phase of random bit generation. At the same time up to 64 additional clocks, which would otherwise be needed for a rotation, are saved.

Figure 3:
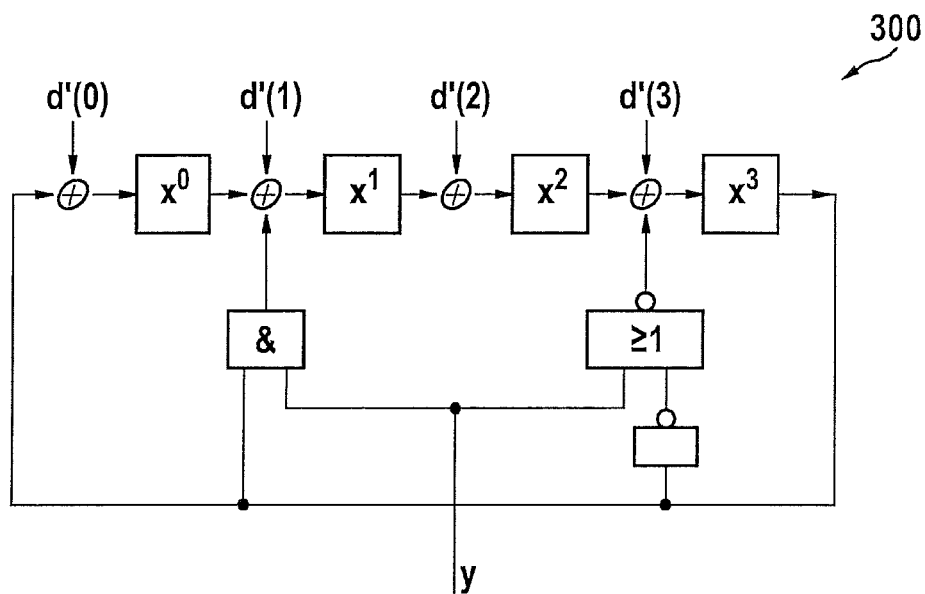
FIG. 3 shows a four-bit NLMISR.

FIG. 3 shows a four-bit NLMISR (nonlinear multiple input signature register) 300, which is used as a state machine.

Instead of the NLMISR in FIG. 3, any other state machine may also be used if the subsequent state and the predecessor state are each determined unambiguously for any predefined input sequence.

The transition function of the circuit of FIG. 3 is specified in the following table.

| Subsequent state of flip-flop xi | Equation |
| --- | --- |
| $x^0$ | $= d'(0) \oplus x^3$ |
| $x^1$ | $= d'(1) \oplus x^0 \oplus yx^3$ |
| $x^2$ | $= d'(2) \oplus x^1$ |
| $x^3$ | $= d'(3) \oplus x^2 \oplus /yx^3$ |

The input bits of all 16 NLMISRs are each the same. However, their initial states are different. According to the aforementioned prerequisite, each NLMISR thus has a different state than each other NLMISR at each point in time.

Figure 4:
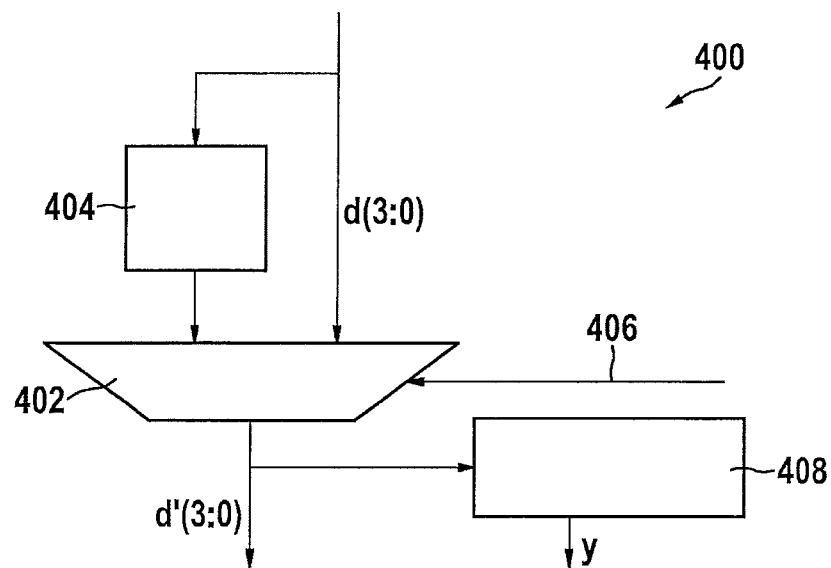
FIG. 4 shows a specific embodiment of an input stage.

FIG. 4 shows one specific embodiment of an input stage labeled with reference numeral 400 as a whole. This diagram shows a multiplexer 402, into which four bits d(3:0) and 4* odd parities 404 are entered as input. These parities are inserted after five input clocks each (arrow 406) before continuing with the next input signals. This yields output y as the antivalence of all signals d'(i) (block 408).

As shown in FIG. 4, an odd parity bit is inserted into the input signal sequence at the corresponding bit positions after five input clocks each, as shown in FIG. 4. These signals are sent to all NLMISRs similarly.

Figure 5:
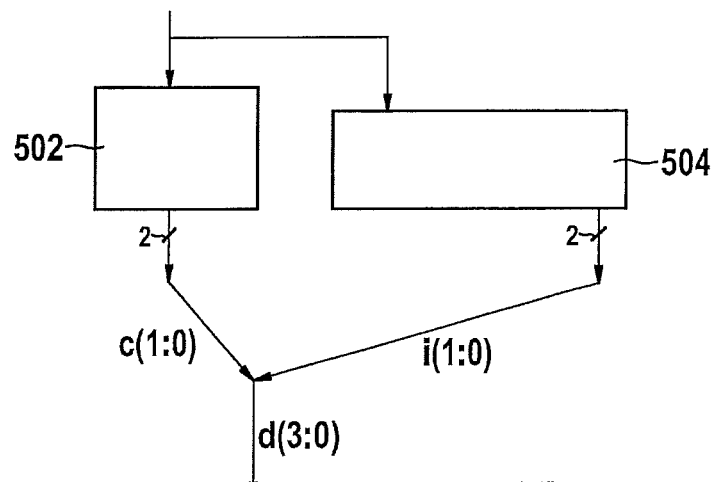
FIG. 5 shows a possible combination of the input signals.

Either input signals d(3:0) are four of the input bits, or only two input bits are used, for example, plus two bits of clock counter c, as shown in FIG. 5. This diagram shows a clock counter c 502 and input bits 504. The input bits are shifted to the right by two places with each clock.

Figure 6:
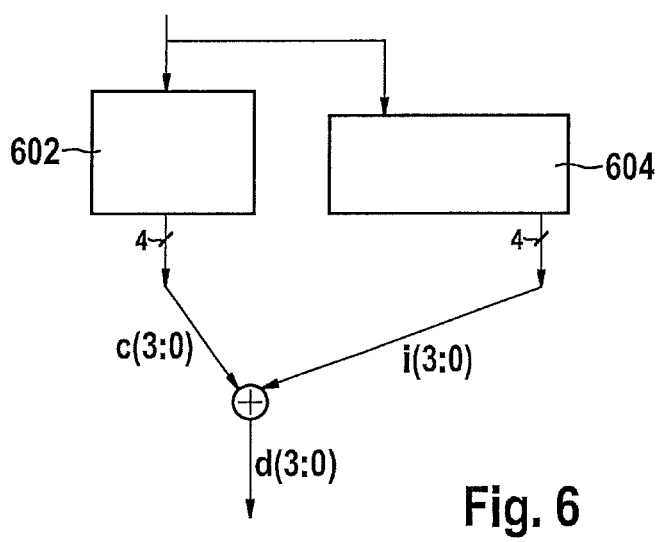
FIG. 6 shows another possible combination of the input signals.

Another possibility is to link the input signals to the bits of the clock counter in an antivalent manner (see FIG. 6). This diagram again shows a clock counter c 602 and input bits 604.

Signals y(3) ... y(0) are formed as follows from modified input signals d'(3:0):

$y(0)=d'(1) \oplus d'(2) \oplus d'(3)$ $y(1)=d'(0) \oplus d'(1) \oplus d'(3)$ $y(2)=d'(0) \oplus d'(1) \oplus d'(3)$ $y(3)=d'(0) \oplus d'(1) \oplus d'(2)$ These signals y(i) are used to form counter values z(i):

| | clock counter | | | | |
|---|---|---|---|---|---|
| c (3:0) | =0, 4, 8, 12 | =1, 5, 9, 13 | =2, 6, 10, 14 | =3, 7, 11, 13 | Bedingung |
| z (0) | =z (0) + 1 | =z (0) + 2 | =z (0) + 4 | =z (0) + 8 | y (0) = 1 |
| z (1) | =z (1) + 2 | = (1) + 4 | =z (1) + 8 | =z (1) + 1 | y (1) = 1 |
| z (2) | =z (2) + 4 | =z (2) + 8 | =z (2) + 1 | =z (2) + 2 | y (2) = 1 |
| z (3) | =z (3) + 8 | =z (3) + 1 | =z (3) + 2 | =z (3) + 4 | y (3) = 1 |

Bedingung=Condition

In addition, the structure may be checked continuously for the fact that not one NLMISR has the same state as another. Therefore, a so-called code check is carried out. The structure is thus robust with respect to error attacks/spike attacks because no random value is released unless the preceding condition is met. In addition, one may thus carry out a self-test of the structure only after conclusion of the input phase and may release the random value thereby generated only after the check.

Figure 7:
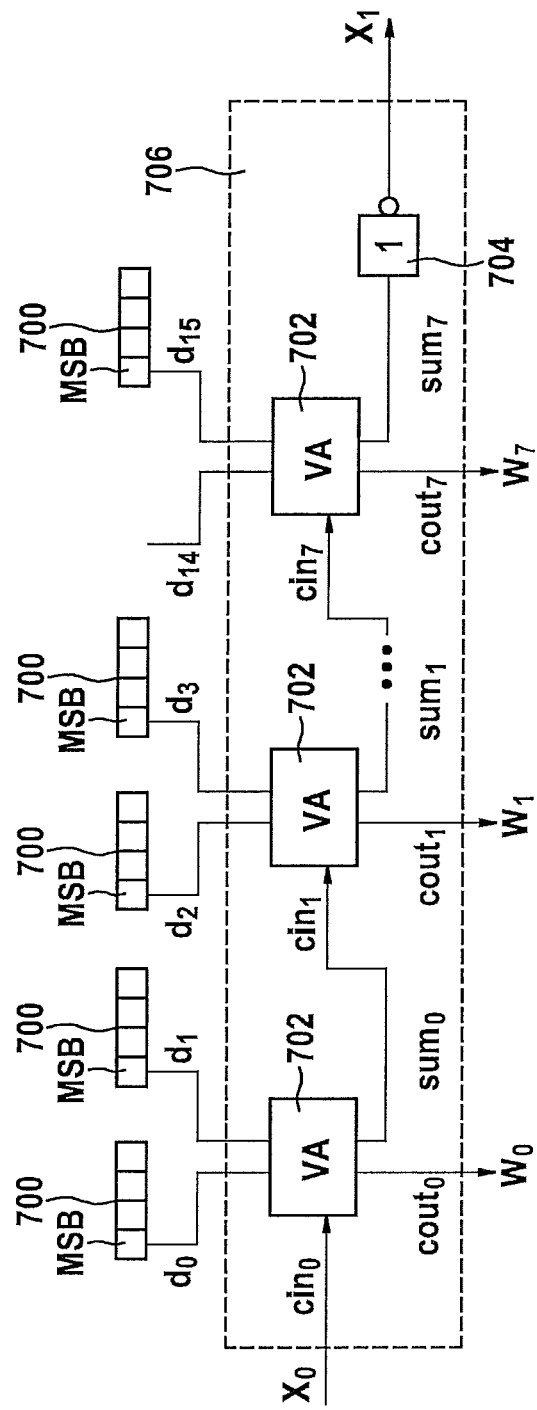
FIG. 7 shows a code reducer.

FIG. 7 shows a so-called weight-averaging circuit (code reducer) WAC_16 for 16 input bits $d_0 \ldots d_{15}$. This diagram illustrates 16 state machines 700 each having four bits, five of which are shown in this diagram. In addition, according to FIG. 7, eight full adders 702 are provided (only three of which are shown) and one NOT gate 704 is provided. A code reducer (WAC) 706 outlined with a dotted line is shown.

In this circuit, the MSBs of the 16 state machines are used as input bits. If the 16 state machines all have a different state, then exactly eight ones are contained in the 16 input bits (8-out-of-16 code). As shown in the literature according to the related art (Stoele, Tarnick), a 4-out-of-8 code is generated at the eight outputs precisely when the input is an 8-out-of-16 code and the reducing circuit does not contain any errors. Input $x_0$ then generates an output $x_1$, wherein $x_1=/x_0$, when there is no error. To ensure the self-test property, $x_0$ must change frequently and also $d_0 \ldots d_{15}$ should not be constant.

Figure 8:
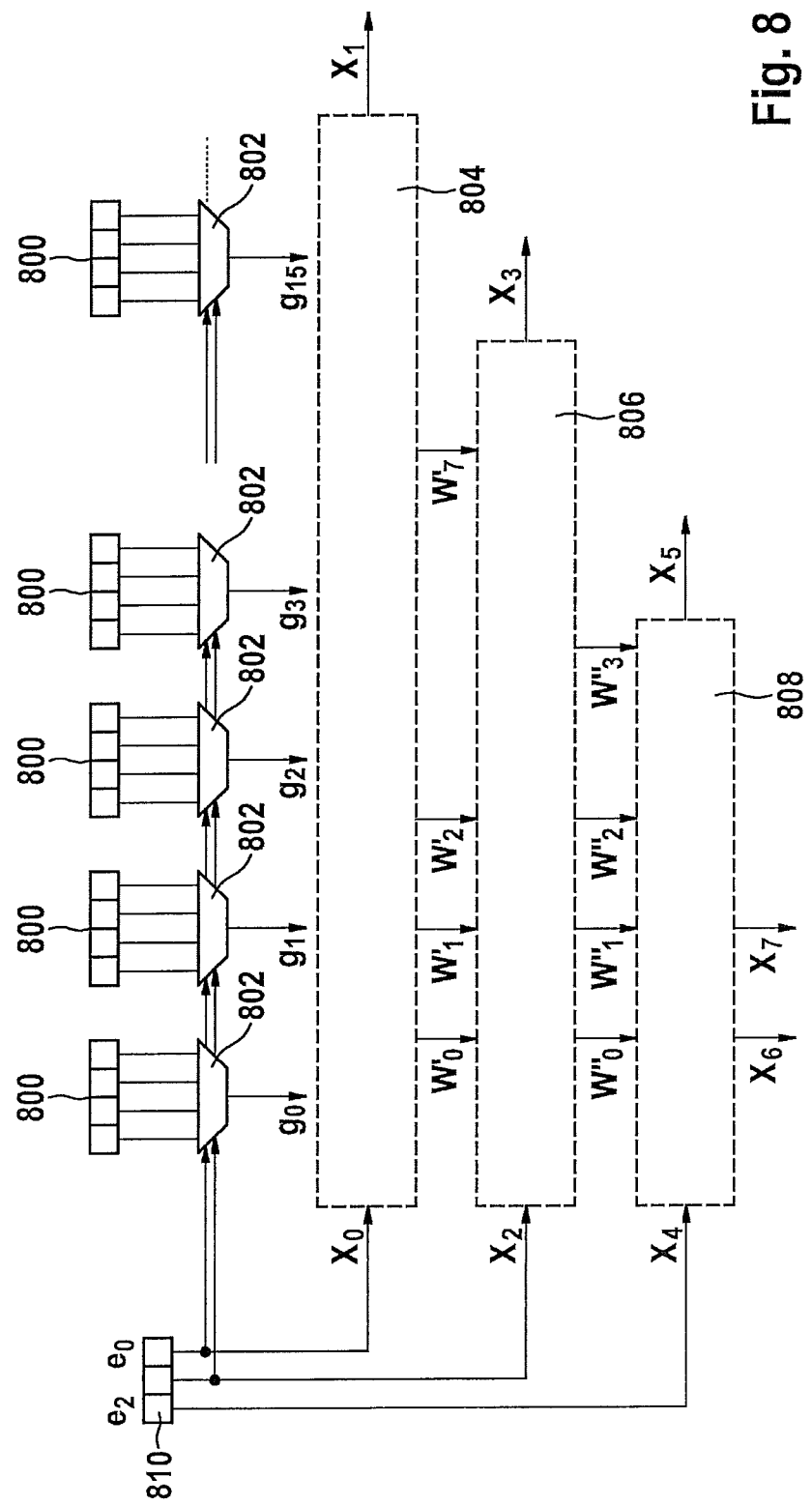
FIG. 8 shows a self-test with the aid of a code check.

FIG. 8 shows a three-stage code reducer. This diagram also shows state machines 800, each having four bits, a corresponding number of 4-to-1 multiplexers 802, a first WAC 804 (WAC_16), a second WAC 806 (WAC_8) and a third WAC 808 (WAC_4) as well as a counter 810.

All 4-to-1 multiplexers 802 are triggered similarly via counter bits e0 and e1, so that each selects the same position bit of state machine 800 as bit $g_i$. Depending on the four states of these two counter bits, a certain bit is thus selected from each of 16 connected state machines 800 and is then processed in WAC_16 804. In an error-free case, these inputs should correspond to an 8-out-of-16 code. Eight outputs $w'_0 \ldots w'_7$ of WAC_16 804 yield a 4-out-of-8 code and are connected to the inputs of WAC_8 806. WAC_8 806 is configured like WAC_16 804 but has only half as many full adders, the last sum bit being inverted when switched to output $x_3$. WAC_4 808, which is then additionally provided, has only two full adders and two outputs $x_6$ and $x_7$ to which the carry-out of these full adders is switched. Output $x_5$ is the inverted sum bit of the second full adder.

FIG. 7 shows how the WAC_16 structure is configured. Corresponding WAC_8 and WAC_4 structures are configured accordingly but each is only half as large, i.e., only half as many adders are used in each case.

Here e2 ... e0 is an event counter, which is incremented with each code check (16 of 64 bits are checked in four phases at the same time).

Figure 9:
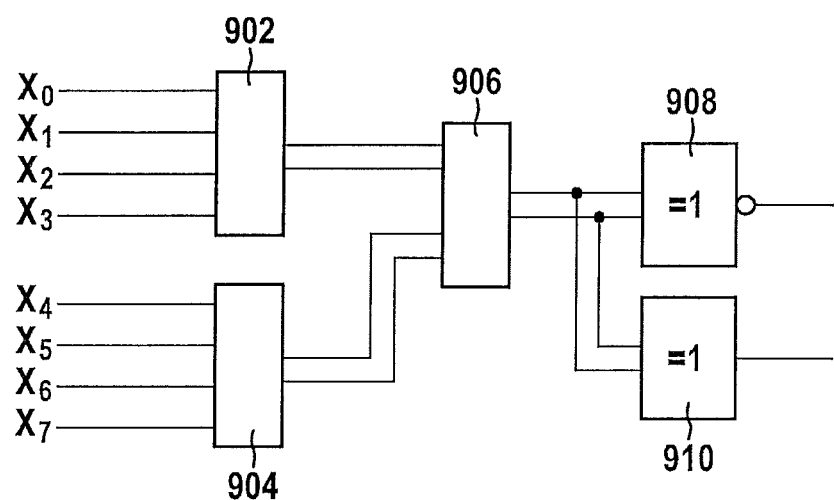
FIG. 9 shows the formation of an error signal.

Dual-rail signals $x_i$, $x_{i+1}$ (i=0, 2, 4, 6) are then linked in the circuit according to FIG. 9 with the aid of two-rail code checkers (TRC) to form an error signal. The signal error indicates either that the code is incorrect or that there is an error in the checker itself (self-testing).

In this regard, the diagram shows a first TRC 902, a second TRC 904 and a third TRC 906. In addition, one equivalence member 908 and one antivalence member 910 are also shown.

To obtain the self-testing property of the code checker, all assignments of the 3-bit event counter must be used for at least one code check. This means that a 16-bit code check must be carried out eight times and thus one code check must be carried out twice for the 64 bits before the event counter is reset again.

The overall circuit including the code checker requires approximately a 1000-gate-equivalent circuit complexity. This is much less than the known circuits require for the same purpose.

To obtain a 4-bit random value from 64-bit seed (the input signals used), either 21 clocks (4-bit input signal per clock) or 40 clocks (2-bit input signal processed per clock) are needed, including parity generation and code check. For a plurality of 4 bits, one needs a corresponding plurality of clocks if one does not want to provide more hardware complexity (parallel structures). If fewer inputs are used as seed, either the number of clocks is reduced accordingly or the seed may also be input repeatedly, at least in part, and in a different order. This is appropriate in particular if the counter values of the clock counter also enter into the state generation of the state machines.

It is also possible that the same 64-bit seed is used for the following 4-bit random values if the order is simply changed. For this purpose, the state machines may each be reset to the secret starting value or the state generated previously may also be used further.

What is claimed is:

1. A method for generating a random output bit sequence in which a configuration of state machines is used, the method comprising:
   providing $2^n$ identically designed state machines which each include n state bits, each of the state machines always taking on a different state than the other ones of the state machines;
   supplying, via an input stage, an identical input signal to each of the state machines at an input end;
   generating, by each of the state machines, n signature bits, which together form a signature bit sequence, each of the state machines forming its respective n signature bits as a function of the respective state of the state machine; and generating the random output bit sequence by selecting, via at least one multiplexer, individual bits from the signature bit sequence of all of the state machines;

wherein n is an integer greater than zero.

2. The method of claim 1, wherein the selection is made as a function of the input signal.

3. The method of claim 1, wherein all of the state machines switch states simultaneously.

4. The method of claim 1, wherein the output bit sequence includes n bits.

5. The method of claim 1, wherein the state of the state machines is checked using a code checker.

6. The method of claim 1, wherein each of the state machines is a register.

7. The method of claim 1, wherein each of the state machines is a non-linear multiple input signature register.

8. The method of claim 1, further comprising:
triggering all of the state machines to change its respective state using a counter.

9. The method of claim 1, wherein the at least multiplexor selects only 1 bit from each of the signature bit signatures and generates the random output bit sequence from those selected bits.

10. A random bit generator for generating a random output bit sequence, comprising:

$2^n$ identically designed state machines, wherein each of the state machines includes n state bits, wherein each of the state machines always assumes a different state than the other ones of the state machines, each of the state machines configured to generate n signature bits which together form a signature bit sequence, the n signature bits of each of the state machines being generated as a function of the state of the respective state machine, wherein n is an integer greater than zero;

an input stage to supply an input signal to the state machines at an input end of the state machines; and at least one multiplexer coupled to the state machines, the at least one multiplexer selecting individual bits from the signature bit sequences of all of the state machines to generate the random output bit sequence.

11. The random bit generator of claim 10, further comprising:
a code checker configured to check the states of the state machines.

12. The random bit generator of claim 10, wherein each of the state machines is a register.

13. The random bit generator of claim 10, wherein each of the state machines is a non-linear multiple input signature register.

14. The random bit generator of claim 10, further comprising:
a counter coupled to the state machines to trigger all of the state machines to change its respective state.

15. The method of claim 10, wherein the at least one multiplexor selects only 1 bit from each of the signature bit signatures and generates the random output bit sequence from those selected bits.

* * * * *